United States Patent [19]

Duranleau et al.

[11] 4,375,425

[45] Mar. 1, 1983

[54] CATALYST FOR THE PRODUCTION OF A HYDROGEN-RICH GAS

[75] Inventors: Roger G. Duranleau, Georgetown, Tex.; Walter C. Gates, Jr., Carmel, N.Y.

[73] Assignee: Texaco Inc., White Plains, N.Y.

[21] Appl. No.: 315,080

[22] Filed: Oct. 26, 1981

Related U.S. Application Data

[62] Division of Ser. No. 214,374, Dec. 8, 1980, Pat. No. 4,338,292.

[51] Int. Cl.$^3$ .................. B01J 23/04; B01J 23/12; B01J 23/72
[52] U.S. Cl. .................................................. 252/467
[58] Field of Search ........................................ 252/467

[56] References Cited

U.S. PATENT DOCUMENTS

| 1,797,426 | 3/1931 | Larson | 423/656 |
| 1,837,254 | 12/1931 | Dew | 423/656 |
| 1,900,883 | 3/1933 | Lusby | 252/467 X |
| 3,140,148 | 7/1964 | Hofer et al. | 252/467 X |
| 3,303,001 | 2/1967 | Dienes | 423/656 X |
| 3,847,836 | 11/1974 | Nicklin et al. | 423/654 X |
| 4,021,366 | 5/1977 | Robin et al. | 423/656 X |

Primary Examiner—W. J. Shine

[57] ABSTRACT

Hydrogen-rich gas is produced by reacting gas mixtures comprising CO and $H_2O$ in a reactor containing an improved unsupported catalyst comprising an alkali-metal promoted partially reduced mixture of at least one copper uranate and at least one oxide of copper. The weight percent uranium present in the activated catalyst, based on total weight of catalyst composition, is in the range of over 50 to about 90.

8 Claims, 1 Drawing Figure

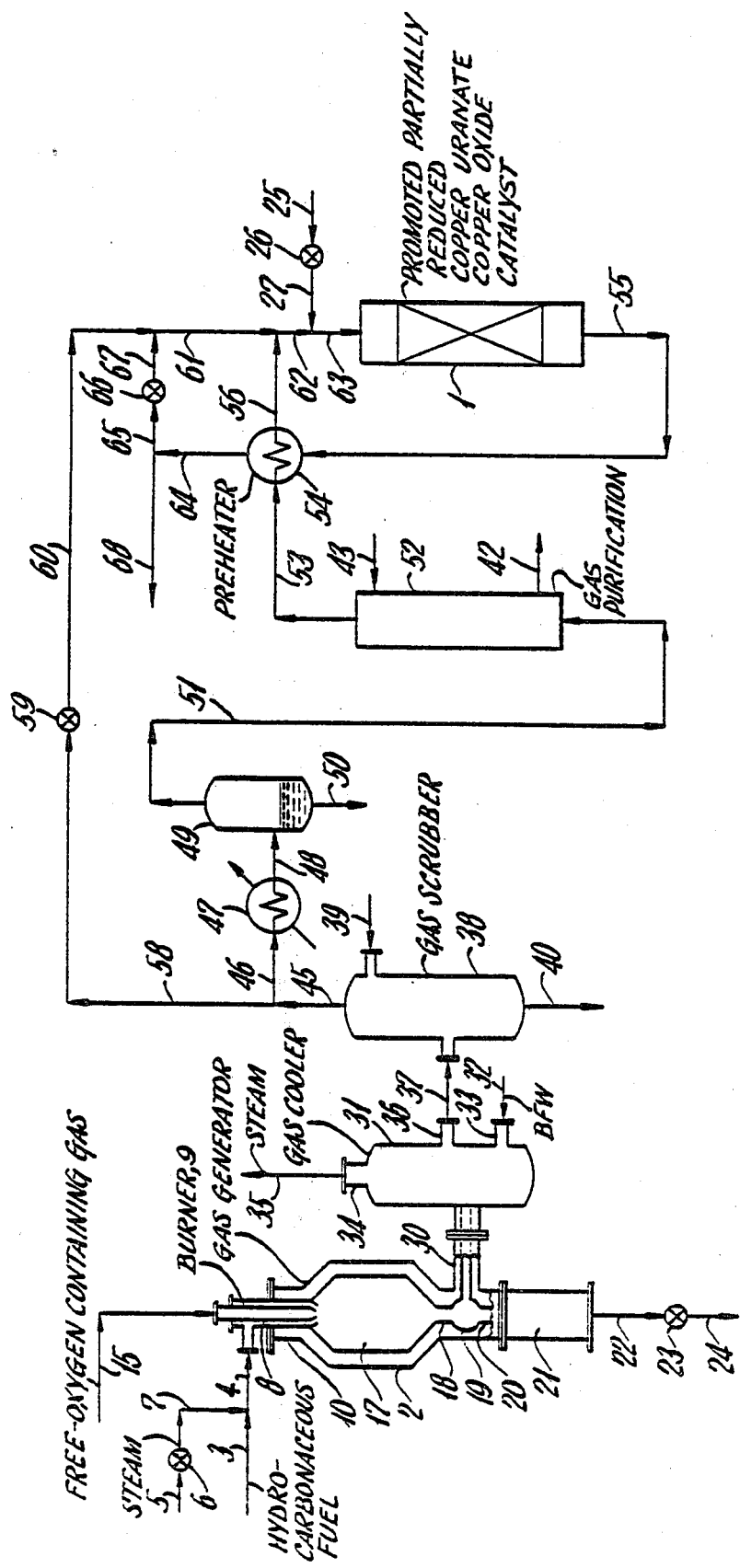

CATALYST FOR THE PRODUCTION OF A HYDROGEN-RICH GAS

This is a division of application Ser. No. 214,374, filed Dec. 8, 1980, now U.S. Pat. No. 4,338,292.

BACKGROUND OF THE INVENTION

1. Field of the Invention

This invention relates to an improved process and catalyst for the production of hydrogen-rich gas.

2. Description of the Prior Art

The catalytic water-gas shift conversion process may be used in the manufacture of hydrogen containing gas mixtures.

The water-gas shift reaction is represented stoichiometrically as follows:

$$CO + H_2O = CO_2 + H_2$$

About 16,700 BTU's are liberated for each pound mole of CO converted. Heat removal and temperature control are therefore necessary to prevent destruction of the catalyst and to attain the desired CO conversion. Ordinarily, the reaction temperature is held in the range of 350° to 1,050° F. (depending upon the catalyst used) by employing two or three separate fixed beds of catalyst. The shifted gases from one bed may be passed through an external heat exchanger and cooled from a high temperature to a comparatively low temperature before being introduced into the next bed.

A typical conventional water-gas shift catalyst is iron oxide promoted by chromium oxide. This catalyst is referred to commonly as a high temperature shift catalyst because it has an ignition temperature in the range of about 600° to 710° F. The effluent gas stream leaving a reaction zone containing high temperature shift catalyst is at a temperature in the range of about 715° to 1,000° F.

Coassigned U.S. Pat. No. 4,021,366 pertains to a process for the production of hydrogen-rich gas by passing a feed gas stream sequentially through a catalyst comprising cobalt-molybdenum or one comprising 3 parts by weight zinc and 1 part by weight copper, and then through promoted iron oxide catalyst.

In U.S. Pat. No. 4,032,556, the methane content of a gas produced by the hydrogenation of a liquid hydrocarbon with a hydrogenating gas at high temperatures is increased by contacting the gas stream with a supported nickel-urania hydrogenation catalyst comprising a maximum of 10 wt. % uranium. U.S. Pat. No. 3,993,459 pertains to a catalyst for converting higher hydrocarbons into gas mixtures containing carbon monoxide, methane and/or hydrogen in which the active components are oxides of the metals lanthanum, cobalt, nickel, uranium, cerium and thorium on an oxide substrate. The catalyst comprises from about 0.1 to 8 percent by weight of uranium. In U.S. Pat. No. 3,847,836 liquid hydrocarbons, e.g. naphtha are steam reformed using a catalyst comprising nickel, and/or nickel oxide, together with a relatively smaller amount of uranium oxide supported on a carrier.

SUMMARY

This is a process employing an improved catalyst for producing a hydrogen-rich gas comprising about 20-100 mole % hydrogen (dry basis) from a CO-containing gas mixture. The catalyst is operable over a wide temperature range. The feed gas stream comprises CO and $H_2O$ in which the mole ratio $H_2O/CO$ is in the range of from about 0.1 to 10.0, such as about 1.0 to 5.0. Preferably, the raw feed gas may be obtained from the partial oxidation of a hydrocarbonaceous fuel, such as liquid or gaseous hydrocarbons and/or solid carbonaceous fuels. In such case, the feed gas after cleaning and optionally purifying may comprise CO, $H_2$, $H_2O$ and at least one member selected from the group consisting of $CO_2$, $CH_4$, $N_2$ and Ar. The feed gas is reacted in a fixed or fluidized bed reactor containing an improved unsupported catalyst consisting essentially of an alkali-metal promoted partially reduced mixture of at least one copper uranate and at least one oxide of copper. The weight percent uranium present in the activated catalyst, based on the total weight of the catalyst composition, is in the range of over 50 to about 90, such as about 60–80; and the weight ratio U/Cu is in the range of about 7-1, such as about 5-2, say about 3.0. Preferably, the uranium in the catalyst composition comprises at least 99.7 wt. % $^{238}U$ isotope. The catalyst has a low reaction initiation temperature, i.e. about 375° F. and is highly active up to about 1500° F. While the hydrogen-rich product gas comprises at least 20 mole % hydrogen, it may range up to about 60 mole % hydrogen on a single pass basis. Very little or no $CH_4$ is produced. After removal of water and acid-gases from the hydrogen-rich gas, a product gas comprising 60–100 mole % $H_2$ is produced.

BRIEF DESCRIPTION OF THE DRAWING

The invention will be better understood by reference to the drawing, which illustrates one embodiment of the disclosed process.

DESCRIPTION OF THE INVENTION

The present invention pertains to an improved continuous process for the production of a gaseous stream comprising 20 to about 60 vol. % $H_2$ or more by the catalytic reaction of CO and $H_2O$. After removal of gaseous impurities such as $H_2O$ and acid gases i.e. $CO_2$, $H_2S$ or COS, the product gas may comprise 60 to 100, say 90 to 99.5 mole % $H_2$. $N_2$, if any, may be separated by conventional cryogenic cooling procedures. Very little or no new $CH_4$ is produced.

An improved, unsupported catalyst consisting essentially of an alkali-metal promoted, partially reduced mixture of at least one copper uranate and at least one oxide of copper is employed as the catalyst in the subject process.

A particular advantage of the subject process is that the gaseous feedstock may be produced from readily available, comparatively low cost, hydrocarbonaceous materials, e.g., liquid and gaseous hydrocarbons and/or solid carbonaceous fuels which may contain a comparatively high content of ash and sulfur. When necessary, the feed gas is purified prior to being introduced into the catalytic reactor. The product gas may be used for organic chemical synthesis, or as a source of substantially pure hydrogen.

The feed gas mixtures being catalytically reacted in the subject process may comprise from about 5–90 mole % CO. The mole ratio $H_2O/CO$ is in the range of from about 0.1 to 10.0, such as about 1.0 to 5.0.

Preferably, the raw feed gas may be produced by the partial oxidation of a hydrocarbonaceous fuel followed by gas purification. In such case, the feed gas stream after cleaning and optionally when required purifying may comprise CO, $H_2$, $H_2O$ and at least one member selected from the group consisting of $CO_2$, $CH_4$, $N_2$ and Ar. It was unexpectedly found that carbon may be prevented from depositing on the catalyst in the reactor by maintaining the feed gas stream with a minimum atomic ratio H/C of 2. The source of the hydrogen in the ratio may be $H_2$, $H_2O$, or both.

Any conventional source of CO in admixture with $H_2O$ may be employed for the feed stream to the catalytic reactor. For example, catalytic steam reforming and particularly the partial oxidation process are suitable. The partial oxidation of a hydrocarbonaceous fuel i.e. liquid hydrocarbons or solid carbonaceous fuel such as coal with a free-oxygen containing gas with or without a temperature moderator produces mixtures of $H_2$ and CO in which the mole ratio $H_2/CO$ may vary in the range of about 0.30 to 5 depending on the source of carbon used. While the above customary convention has been adopted herein for expressing ranges of ratios, the aforesaid range of ratios may also be expressed in the following manner: 0.30/1 to 5/1. In general, western coals and lignites will yield gas mixtures in which the mole ratio $H_2/CO$ may vary in the range of about 0.4 to 0.6. By the subject process, from about 40 to 99.5, say about 92 to 98 mole % of the CO originally present in the feed stream may be converted into $H_2 + CO_2$ by the catalytic water-gas shift reaction, as shown by the following equation:

$$CO + H_2O \rightarrow H_2 + CO_2 \qquad (1)$$

In the subject process, a continuous effluent gas stream comprising CO, $H_2$, $H_2O$, and at least one member of the group consisting of $CO_2$, $H_2S$, COS, $CH_4$, $N_2$, Ar, particulate carbon, and ash is produced in the refractory lined reaction zone of a separate free-flow unpacked noncatalytic partial oxidation fuel gas generator. The gas generator is preferably a vertical steel pressure vessel, such as shown in the drawing and described in co-assigned U.S. Pat. No. 2,992,906 issued to F. E. Guptill, Jr.

A wide range of combustible carbon containing organic materials may be reacted in the gas generator with a free-oxygen containing gas optionally in the presence of a temperature moderating gas to produce said effluent gas stream.

The term hydrocarbonaceous is used herein to describe various suitable feedstocks to the partial oxidation gas generator and is intended to include gaseous, liquid, and solid hydrocarbons, carbonaceous materials, and mixtures thereof. In fact, substantially any combustible carbon containing organic material, fossil fuel, or slurries thereof, may be included within the definition of the term "hydrocarbonaceous". For example, there are (1) pumpable slurries of solid carbonaceous fuels, such as coal, lignite, particulate carbon, petroleum coke, concentrated sewer sludge, and mixtures thereof in water or in liquid hydrocarbon fuels;

(2) gas-solid suspensions, such as finely gound solid carbonaceous fuels dispersed in either a temperature moderating gas or in a gaseous hydrocarbon; and (3) gas-liquid-solid dispersions, such as atomized liquid hydrocarbon fuel or water and particulate carbon dispersed in a temperature-moderating gas. The hydrocarbonaceous fuel may have a sulfur content in the range of about 0 to 10 weight percent and an ash content in the range of about 0 to 15 weight percent.

The term liquid hydrocarbon, as used herein to describe suitable liquid feedstocks, is intended to include various materials, such as liquefied petroleum gas, petroleum distillates and residues, gasoline, naphtha, kerosine, crude petroleum, asphalt, gas oil, residual oil, tar-sand oil and shale oil, coal derived oil, aromatic hydrocarbon (such as benzene, toluene, xylene fractions), coal tar, cycle gas oil from fluid-catalytic-cracking operation, furfural extract of coker gas oil, and mixtures thereof. Suitably, the liquid hydrocarbons have a gravity in degrees API in the range of about −20 to 100. Gaseous hydrocarbon fuels, as used herein to describe suitable gaseous feedstocks, include methane, ethane, propane, butane, pentane, natural gas, water-gas, coke-oven gas, refinery gas, acetylene tail gas, ethylene off-gas, synthesis gas, and mixtures thereof. Both gaseous and liquid feeds may be mixed and used simultaneously, and may include paraffinic, olefinic, naphthenic, and aromatic compounds in any proportion.

Also included within the definition of the term hydrocarbonaceous are oxygenated hydrocarbonaceous organic materials including carbohydrates, cellulosic materials, aldehydes, organic acids, alcohols, ketones, oxygenated fuel oil, waste liquids and by products from chemical processes containing oxygenated hydrocarbonaceous organic materials and mixtures thereof.

The hydrocarbonaceous feed may be at room temperature or it may be preheated to a temperature up to as high as about 600° F. to 1,200° F., say 800° F., but preferably below its cracking temperature. Preheating the hydrocarbonaceous feed may be accomplished by non-contact heat exchange or direct contact with by-product superheated or saturated steam produced in the subject process. The hydrocarbonaceous feed may be introduced into the burner in liquid phase or in a vaporized mixture with a temperature moderator. Suitable temperature moderators include superheated steam, saturated steam, unsaturated steam, water, by-product, $CO_2$-rich gas, a portion of the cooled exhaust from a turbine employed downstream in the process, nitrogen in air, by-product nitrogen from a conventional air separation unit, and mixtures of the aforesaid temperature moderators.

The term free-oxygen containing gas or gaseous oxidant as used herein is intended to mean a gas selected from the group consisting of air, oxygen-enriched air (22 mole percent $O_2$ and higher), and preferably substantially pure oxygen (95 mole percent $O_2$ and higher). The amount of nitrogen in the product gas may be substantially reduced or eliminated by using substantially pure oxygen. The ratio of free-oxygen in the gaseous oxidant to carbon in the feed-stock (O/C, atom/atom) is in the range of about 0.6 to 1.5, suitably about 0.7 to 1.2 and preferably below 1.0.

$H_2O$ is preferably introduced into the reaction zone to help control the reaction temperature, to act as a dispersant of the hydrocarbonaceous fuel fed to the reaction zone, and to serve as a reactant to increase the relative amount of hydrogen produced. About 0.15 to 5.0 pounds of $H_2O$ are introduced per pound of hydrocarbonaceous fuel. Other suitable temperature moderators include $CO_2$-rich gas, a cooled portion of effluent gas from the gas generator, cooled off-gas from an integrated ore-reduction zone, nitrogen, and mixtures thereof. A temperature moderator may not be required with gaseous fuels.

The subject improved catalyst comprises an alkali-metal promoted partially reduced mixture of at least one copper uranate selected from the group consisting of $CuUO_4$ and $CuU_3O_{10}$, and at least one oxide of copper selected from the group consisting of CuO and $Cu_2O$. The total amount of uranium present in the partially reduced catalyst, based on the total weight of the partially reduced i.e. activated catalyst composition, is in the range of over 50 to about 90, say about 60 to 80 weight percent. The weight ratio of U/Cu of the activated catalyst is in the range of about 7-1, such as about 5-2, say about 3.0.

Preferably, the uranium in the present catalyst composition comprises at least 99.7 weight percent $^{238}U$ isotope. Advantageously, the tailings produced by conventional $^{235}U$ enrichment processes may be easily converted into $U_3O_8$ in which at least 99.7 wt. % of the uranium is present as $^{238}U$ isotope. Thus, tailings which were once a burdensome waste material may now be used as a low cost raw material for the production of the catalyst of the subject invention.

The expression "alkali-metal" promoter includes at least one member selected from the group consisting of potassium, sodium, and cesium. Typical examples of alkali metal compounds that may be used in the production of the subject catalyst composition to supply said alkali metals are the respective alkali metal oxides or the salts of oxygen-containing acids such as carbonates, bicarbonates, nitrates, oxalates and acetates, and/or hydroxides of said alkali metals which yield the oxides at elevated temperatures. The preferred alkali metal in the activated catalyst is potassium in the form of the compound $K_2O$. The alkali metal oxide content of the catalyst may range from about 0.01 to 2 weight percent, say about 0.5-1 weight percent based on the total weight of the catalyst.

Most conventional catalysts employ a suitable support material such as aluminum oxide, silicon oxide, or an oxide of magnesium, calcium, or barium. In contrast, the subject improved bulk catalyst is unsupported. A completely inactive catalyst resulted when the ingredients of the subject catalyst were incorporated on said supporting materials.

The subject catalysts are prepared, primarily, by thermally decomposing copper nitrate hexahydrate and an alkali metal compound in the presence of at least one oxide of uranium selected from the group consisting of $U_3O_8$, $UO_3$, and $UO_2$. A mixture consisting essentially of at least one copper oxide, and at least one copper uranate, and an alkali metal oxide is thereby produced, such as the following mixtures of compounds in weight percent:

Formula A—CuO 1.0 to 30, $Cu_2O$ 1.0 to 30, $CuUO_4$ 70 to 98, and $K_2O$ 0.01 to 2.0.

Formula B—CuO 1.0 to 30, $CuU_3O_{10}$ 70 to 98, and $K_2O$ 0.01 to 2.0.

Formula C—CuO 1.0 to 30, $CuUO_4$ 30 to 68, $CuU_3O_{10}$ 30 to 68 and $K_2O$ 0.01 to 2.0.

It is necessary to partially reduce the aforesaid mixtures by treatment with pure hydrogen at high temperatures and pressures in order to produce the activated catalyst of the subject invention. After said treatment with hydrogen, at least 30 up to about 80, say 40 to 60 wt. % of the copper present in the activated catalyst is in the metallic state. From about 85 to 100, such as at least 90 wt. % of the remainder of the copper present in the activated catalyst may be in the form of at least one copper uranate selected from the group consisting of $CuUO_4$ and $CuU_3O_{10}$. The balance of the copper, if any, may be present in the activated catalyst in the form of at least one oxide of copper selected from the group consisting of CuO and $Cu_2O$. From about 10 to 100, such as about 20 to 80, say at least 90 wt. % of the uranium in the activated catalyst may be present in the form of at least one copper uranate selected from the group consisting of $CuUO_4$ and $CuU_3O_{10}$. The balance of uranium, if any, may be present in the activated catalyst in the form of at least one oxide of uranium selected from the group consisting of $U_3O_8$, $UO_3$ and $UO_2$.

In the preparation of the subject catalyst, about 29.6 g to 2,956.0 g such as 0.1 to 10 moles of copper nitrate hexahydrate ($Cu(NO_3)_2.6H_2O$) are heated in a stainless steel vessel to a temperature in the range of about 228° to 272° F., such as 238° to 250° F. and melted. The material is stirred as it is heated and 0.05 to 18.0 g, such as 0.00036 to 0.1333 moles of an alkali metal compound having the formula M-A wherein M is an alkali metal selected from the group consisting of Na, Ce, and K, and A is a member selected from the group consisting of $CO_3$, $HCO_3$, $NO_3$, OH, oxalate and acetate, are added to the melt. The mixture is continually stirred at the melting temperature as 84 g to 8420 g such as 0.1 to 10 moles of at least one uranium oxide selected from the group consisting of $U_3O_8$, $UO_3$, and $UO_2$ are gradually added over a period of about 15 to 25 minutes.

After emission of nitrogen oxides and frothing ceases, the product thickens to a brown mass having a rubbery consistency. Mixing is continued from about 20 to 100 minutes. The mass is then cut up into small chunks and then heated for 16 to 24 hours at a temperature in the range of about 50 to 200 F. The chunks are then dried for 1 hour in a forced air oven at a temperature in the range of about 160° to 350° F. and then heated in a muffle furnace to a temperature of about 400° F. The temperature is raised 100° F. per hour until a temperature in the range of about 675° to 725° F. is reached and maintained for about 2.5 to 3.5 hours.

At this time the material is in the form of a powder whose particle size may be further reduced, by crushing, to about 100 to 1000 microns, such as 150 to 600 microns, say 300 microns. Alternatively, the powder may be mixed with a binder, such as stearic acid and molded into pellets having a diameter in the range of about 1/16" to ¼", say 5/32". The pellets are heated in a muffle furnace under a slow stream of nitrogen to a temperature in the range of about 550°-650° F. for 2-3 hours, and then at 750°-850° F. for an additional 3-4 hours.

The catalyst is activated by being partially reduced with pure hydrogen. 1500 to 6500 standard cubic centimeters per minute of $H_2$ per 100 cc of catalyst are passed through the catalyst in a reactor for 10-15 hours at a temperature in the range of about 850°-900° F. and 200-250 psig pressure. The pressure is then increased to about 310 to 350 psig and the hydrogen treatment is continued for an additional 6-8 hours at the same conditions of flow rate and temperature.

Conventional fixed bed, ebullient bed, or fluidized bed reactors may be used for converting the feed gas into the hydrogen-rich gas stream. Preferably, a fixed bed reactor is employed. Since the reaction is highly exothermic, temperature control may be effected by any of the following techniques: distribution of the feed gas throughout the fixed bed reactor by means of separate inlet points, imbedding tubular coolers in the catalyst beds and producing steam which may be used elsewhere in the process, or cooling the effluent gas between beds, with simultaneous steam generation.

Advantageously, no recycle is required with the subject highly active catalyst. However, optionally about 0.5-25, say about 2-5, volumes of the product gas may be mixed with each volume of fresh feed gas. The temperature of the inlet feed gas stream to the reactor may be in the range of about 375°-650° F., such as about 395°-550° F. The fresh feed may be preheated to the proper inlet temperature by (1) indirect heat exchange with at least a portion of the product gas leaving the reactor, (2) by direct mixing with a portion of recycle product gas, or (3) by (1) followed by (2) or (2) followed by (1).

The catalyst bed temperatures are not critical and can be allowed to rise as much as 850° F. The catalyst is active at the lower range and will start to make $H_2$ and $CO_2$. The bed temperature can climb rapidly up to about 1500° F., such as 1200° F. and still produce near theoretical amounts of $H_2$.

Space velocities (standard volumes of dry gas per volume of catalyst per hour-vol./vol./hr) may be in the range of about 350-10,000, such as 800-6,000. The pressure in the reactor is in the range of about 1-300 atmospheres, such as 10-150 atmospheres. The reaction time is in the range of about 1-100, such as 3-60 seconds. The catalyst has a long life without appreciable deterioration. Carbon deposition may be resisted by maintaining an atomic ratio in the feed gas of H/C of at least 2. The feed gas stream to the reactor may be preheated to the proper inlet temperature by indirect heat exchange with at least a portion of the effluent gas stream leaving the reactor at a temperature for example in the range of 600° to 1500° F. If necessary, the catalyst may be regenerated and most of its activity restored by hydrogen treatment or by burning in air followed by treatment with hydrogen.

With feedstreams comprising CO in admixture with $H_2O$, the $H_2$-rich gas stream leaving the catalytic reactor after a single pass comprises in the dry basis at least 20 mole % to 60 or more mole % $H_2$. Using conventional methods the effluent gas from the reactor may be optionally dried and purified by removing unwanted gaseous materials i.e. $H_2O$, $CO_2$, and $n_2$. For example, at least a portion of the effluent gas stream from the reactor may be cooled below the dew point to condense and separate out water. $CO_2$ may be removed by scrubbing the dry gas stream with a conventional solvent absorbent. By this means the $H_2$-rich product gas may comprise about 60 to 100 mole % $H_2$, such as 95 to 99 mole % $H_2$.

DESCRIPTION OF THE DRAWING

In one embodiment of the previously described process, as shown in the accompanying schematic drawing, the feed gas to the CO catalytic reactor 1 is originally produced in the reaction zone of free-flow unpacked noncatalytic partial oxidation synthesis generator 2 at an autogenous temperature in the range of about 1700° to 3000° F. and a pressure in the range of about 1 to 300 atmospheres.

A hydrocarbonaceous fuel in line 3 is passed through line 4 with or without a temperature moderator from line 5, valve 6, line 7 and then down through annular passage 8 of burner 9 located in upper central inlet 10 of vertical free-flow refractory lined non catalytic gas generator 2. Simultaneously, a stream of free-oxygen containing gas in line 15 is passed down through central conduit 16 of burner 9.

Preheating of the reactants is optional but generally desirable. For example, a hydrocarbon oil and steam may be preheated to a temperature in the range of about 100° to 800° F. and the oxygen may be preheated to a temperature in the range of about 100° to 1000° F.

The downflowing feedstreams impinge and the partial oxidation reaction takes place in reaction zone 17. The raw effluent gas stream leaving the partial oxidation gas generator through bottom outlet 18 passes through insulated line 30 and may have the following composition in mole %: $H_2$ 20-70; CO 15-60; $CO_2$ 3-30; $H_2O$ 5-15; $CH_4$ nil-20; $N_2$ nil-60; $H_2S$ 0-5.0; COS 0 to 0.2; Ar 0-2.0; entrained particulate solids; and possibly slag.

Unreacted particulate carbon (on the basis of carbon in the feed by weight) entrained in the effluent gas stream comprises about 0.2 to 20 weight percent from liquid feeds but is usually negligible from gaseous hydrocarbon feeds. At least a portion of any entrained particulate solid matter and slag may be separated from the effluent gas stream leaving the gas generator in a suitable gas-solids separating zone without lowering the temperature or pressure of the gas stream. For example, particulate matter and slag, if any, may separate out in gas diversion and solids separation chamber 19 and pass through passage 20 into slag chamber 21. Slag chamber 21 may be connected in axial alignment with the free-flow gas generator 2. By this means, ash and other solids or molten slag in the gas stream discharging from the lower part of reaction chamber may drop directly into a pool of water contained in the bottom of the slag chamber. The separated material may be intermittently removed through line 22, valve 23, and line 24.

The hot effluent gas stream leaving gas diversion and solids separation chamber 19 is passed through insulated line 30 and into gas cooler 31 where it may be cooled to a temperature in the range of about 400° to 800° F., say about 450° to 650° F. by indirect heat exchange with water. Boiler feed water enters gas cooler 31 by way of line 32 and inlet 33. The water is converted into stream which leaves by way of outlet 34 and line 35. By-product steam is thereby produced for use elsewhere in the system and/or for export. For example, a portion of the steam may be passed through line 25, valve 26, line 27, and mixed in line 63 with the feedgas stream from line 62. Alternatively, all of the hot raw effluent gas stream leaving the gas generator may be cooled by direct quenching in water. By this means a portion of the entrained solid matter may be removed from the gas stream. Further, the gas stream is thereby saturated with $H_2O$ so that little or no $H_2O$ need be added prior to the water-gas shift reactor.

The partially cooled stream of effluent gas leaving gas cooler 31 through outlet 36 and line 37, or the effluent gas stream leaving a quench tank not shown, is passed into a gas cleaning zone where any remaining entrained solids may be removed. Any conventional procedure for removing suspended solids from the gas stream may be employed. For example, the effluent gas stream may be passed through a scrubbing column in direct contact and counterflow with a scrubbing fluid selected from the group consisting of liquid hydrocarbon, dilute mixtures of particulate carbon and scrubbing fluid, or water. A slurry of particulate carbon and scrubbing fluid may be then removed from the bottom of the column and sent to a carbon separation or concentration zone. Carbon concentration may be effected by any suitable conventional means e.g. filtration, centrifuge, gravity settling, or by liquid hydrocarbon extraction such as the process described in coassigned U.S. Pat. No. 4,205,963. In the scheme shown in the drawing, the effluent gas stream is scrubbed with water in gas scrubber 38. The water enters through line 39 and the dispersion of solids and water leaves through line 40 and is sent to a conventional facility not shown for the recovery of water and carbon. The gas stream in line 45 may be then passed directly through lines 58-63 and into catalytic reactor 1. Optionally, supplemental $H_2O$ from line 25 and/or recycle gas from line 67 may be mixed with the cooled and cleaned gas stream from line 60.

When necessary, at least a portion of the cooled and cleaned gas stream in line 45 may be treated to remove gaseous impurities i.e. acid-gas. The purified and any unpurified portions of the gas stream are then combined in line 62 and fed to the reactor. In said embodiment, at least a portion i.e. 50-100 volume percent of the clean gas stream leaving gas scrubber 38 at a temperature in the range of about 375°-725° F. may be passed through lines 45, 46 and cooled below the dew point in gas cooler 47. Water and normally liquid hydrocarbons, if any, may be thereby condensed out. The mixture of gas and liquids is passed through line 48 and separated in gas-liquids separator 49. The liquids are removed from separator 49 by way of line 50 at the bottom. The substantially dry gas stream passes overhead through line 51 into the gas purification section 52 at a temperature in the range of about 100°-175° F. Any suitable conventional process may be used for purifying the process gas stream in gas purification section 52. Typical gas purification processes may involve refrigeration and physical or chemical absorption with a solvent, such as methanol, n-methyl-pyrrolidone, triethanolamine, propylene carbonate or alternatively with hot potassium carbonate. For example, the gas stream may be washed with cold methanol and the total sulfur, $H_2S$ plus COS, may be reduced to less than 0.1 ppm. All of the $CO_2$ may be then removed to produce a purified process gas stream containing less than 5 ppm $CO_2$. The solvent is regenerated and recycled to the absorption column for reuse. Thus, rich solvent absorbent is removed from gas purification section 52 by way of line 42, regenerated, and returned as lean solvent absorbent by way of line 43. One or more of the gases separated from the solvent absorbent during regeneration, and preferably $CO_2$, may be recycled to the partial oxidation gas generator as at least a portion of the temperature moderator. When necessary, final clean-up may be accomplished by passing the process gas stream through iron oxide, zinc oxide, or activated carbon to remove residual traces of $H_2S$ or organic sulfide. Thus, at least one of the following gaseous impurities when present in the process gas stream may be removed in gas purification section 52: $CO_2$, $H_2S$ COS, Ar, $N_2$, and $H_2O$. Optionally, a portion of the $N_2$ may be allowed to remain in the process gas stream to impart improved temperature control within catalytic reactor 1. Optionally, at least a portion of the $H_2O$ may be left in the process gas stream for the water-gas shift reaction.

A cleaned and purified gas stream leaves gas purification section 52 through line 53 at a temperature in the range of about 70°-150° F. This gas stream is heated in heat exchanger 54 by indirect heat exchange with the hot product gas leaving reactor 1 by way of line 55 at a temperature in the range of about 600°-1500° F. The heated feed gas stream leaving heat exchanger 54 passes through lines 56, 62, and 63, and with or without admixture with supplemental steam from line 25, valve 26, line 27 enters catalytic reactor 1 at a temperature in the range of about 375°-650° F. The remaining portion, if any, of the cleaned gas stream leaving overhead in line 45 of gas scrubber 38 and bypassing the gas drying and purification sections by way of line 58, valve 59, and line 60 is mixed in line 61 with the recycle portion of the product gas if any, that leaves heat exchanger 54 through line 64, 65, valve 66, and line 67. That portion of the partially cooled product gas stream from line 64, which is not recycled, is passed through line 68, and optionally further purified by conventional means to remove any unwanted impurities i.e. $CO_2$, $H_2O$, and $N_2$.

$H_2O$ may be added to the feed stream through line 25 separately in the form of water or steam. Alternatively, at least a portion of the $H_2O$ in the gas stream leaving gas scrubber 38 may be allowed to remain. The mole ratio of $H_2O/CO$ in the feed gas mixture in line 63 is in the range of 0.1 to 10, say 1 to 5. Reactor 1 is a fixed bed reactor containing the subject unsupported catalyst comprising an alkali-metal promoted partially reduced mixture of at least one copper uranate and at least one oxide of copper. The pressure in reactor 1 is substantially the same as that in partial oxidation gas generator 2 i.e. 1-300 atmospheres, say 10-200 atmospheres, less the ordinary pressure drop in the lines i.e. 4-7 atmospheres.

The $H_2$-rich product gas in line 68 may have the following composition in mole % (dry basis): $H_2$ 20-60, CO nil-40, $CH_4$ nil-20, $CO_2$ 20-60, $N_2$ nil-60, Ar nil-2.0. Any or all of the gaseous impurities may be removed by conventional gas purification methods not shown to produce a $H_2$-rich gas, substantially pure $H_2$, or synthesis gas ($H_2+CO$). For example, $CO_2$ may be separated and at least a portion recycled to synthesis gas generator 2 as at least a portion of the temperature moderator.

EXAMPLES

The following examples are offered as a better understanding of the present invention, but the invention is not to be construed as limited thereto.

EXAMPLE I

Example I will illustrate a preferred method for preparing a catalyst composition which is activated in Example II according to this invention.

499.6 gms (1.69 moles) of copper nitrate hexahydrate ($Cu(NO_3)_2.6H_2O$) were melted and mixed with 1.66 gms (0.0143 moles) of potassium carbonate ($K_2CO_3$). The mixture was maintained at the melting temperature and continuously stirred while 349.5 gms (0.417 moles) of triuranium octoxide powder ($U_3O_8$) were added gradually over a twenty minute period. The product thickened and was cut into small chunks and allowed to remain on a steam plate for about 20 hours. After being dried for 1 hour in a forced air oven at a temperature of about 250° F., the chunks were heated in a muffle furnace to a temperature of 400° F. The temperature was then raised 100° F. per hour until 700° F. was reached and then maintained for 3 hours. By that time the chunks had become a fine powder. The powder was further crushed to allow total passage through a 50 mesh screen (297 microns). The powder was then mixed with 10 grams of stearic acid powder and pelleted into 5/32 inch diameter pellets. The pellets were heated in a muffle furnace under a slow stream of $N_2$ for 2 hours, and then for an additional 3 hours at a temperature of 800° F. The final catalyst was designated Catalyst A, and had the following approximate chemical composition in weight percent: CuO 3.6, $Cu_2O$ 2.9, $CuUO_4$ 93.32, and $K_2O$ 0.19. Catalyst A was activated in the manner described in Example II, prior to being used in Example II. In one embodiment, the uranium in the subject catalyst composition comprised at least 99.7 weight percent $^{238}U$ isotope.

the reactor was lowered to 403.5° F. and the mole %, CO conversion dropped to 45.2.

TABLE I

| Run No. | Feed Gas Mole Ratio | | Reaction Conditions | | | | CO Conversion Mole % | Product Gas Mole % (dry Basis) | | | % C Containing Liquids |
|---|---|---|---|---|---|---|---|---|---|---|---|
| | $H_2/CO$ | $H_2O/CO$ | Pressure psig. | Temp. °F. Avg. | SV vol/vol/hr | Time Sec. | | $H_2$ | $CO_2$ | CO | |
| 1 | 0.0 | 1.94 | 300 | 486.8 | 405 | 33.6 | 99.2 | 56.0 | 43.5 | 0.5 | 0 |
| 2 | 0.0 | 1.86 | 300 | 467.4 | 408 | 35.1 | 91.7 | 47.8 | 46.8 | 5.5 | 0 |
| 3 | 0.0 | 2.00 | 300 | 403.5 | 405 | 36.1 | 45.2 | 21.9 | 34.7 | 43.4 | 0 |
| 4 | 0.0 | 2.14 | 100 | 613.0 | 405 | 10.1 | 98.1 | 51.6 | 47.2 | 1.2 | 0 |
| 5 | 0.0 | 1.92 | 0 | 623.4 | 405 | 1.4 | 92.8 | 48.1 | 47.0 | 4.9 | 0 |

EXAMPLE II

Catalyst A, prepared in accordance with Example I, was used in the production of hydrogen-rich gas after being activated by being partially reduced in the following manner. Catalyst A was inserted in a fixed bed pilot plant reactor simulating the conditions of an adiabatic reactor of industrial size operated without recycle. The reactor was constructed from 54 inches of 1 inch, Sch. 80 316 stainless steel (SS) pipe and had 316 SS seal-pieces at each end against 4 inch diameter heads. The top seal-piece was provided with a central inlet whereas the bottom seal-piece had a side outlet. The reaction chamber nominally contained 100 cc of Catalyst A in a 10-inch bed.

Catalyst A was treated within the reactor with 2,000 standard cubic centimeters per minute of pure hydrogen for a period of 10 hours at a temperature of 850° F. and a pressure of 200 psig. This was followed by an additional 6 hours of treatment with hydrogen at the same flow and temperature conditions but at a pressure of 320 psig. By means of the previously described treatment with hydrogen, Catalyst A was partially reduced so that about 50–60 weight percent of the copper was present in the metallic state. The uranium was present in the activated catalyst primarily in the form of at least one copper uranate selected from the group consisting of $CuUO_4$ and $CuU_3O_{10}$ and less than 5 weight percent of uranium oxide selected from the group consisting of $U_3O_8$, $UO_3$, and $UO_2$. The weight percent of uranium present in the activated catalyst, based on the total weight of the activated catalyst, was 64. The weight ratio U/Cu in the activated catalyst was about 3.0.

Runs 1 to 5 in Table I below, illustrate the use of the activated catalyst of the subject invention as prepared in Examples I and II. Data is provided in Table I for the production of hydrogen-rich gas comprising at least 20 mole percent (dry basis) of $H_2$ by passing a feed gas comprising CO and $H_2O$ through a fixed-bed reactor containing the subject catalyst. The recycle ratio i.e. moles of recycle gas per mole of fresh feed was 0. Conventional equipment for measuring and controlling the rate of flow of the feed and product streams, temperature and pressure, and sampling and metering were provided.

More than 90 mole % of the CO in the feed gas was converted into $H_2$ and $CO_2$, in Runs 1, 2, 4 and 5, where the average reaction temperature was in the range of about 467°–623° F. and the pressure was in the range of about 0–300 psig. In Run 3, the average temperature in the reactor was lowered to 403.5° F. and the mole %, CO conversion dropped to 45.2.

As the reaction temperature dropped for a given pressure, the mole % CO conversion and mole % $H_2$ in the product gas dropped. As the pressure dropped, higher reaction temperatures were required in order to maintain the same level of CO conversion.

The overall results as shown in Table I serve to point out that the activated catalyst of the subject invention is very active in converting CO to $H_2$ and $CO_2$ even on a one-pass basis, has good selectivity to hydrogen, and has good thermal resistance.

It will be evident to those skilled in the art that various modifications of this invention can be made, or followed, in the light of the foregoing disclosure and discussion, without departing from the spirit or scope thereof.

We claim:

1. A catalyst composition consisting essentially of an alkali-metal promoted partially reduced mixture of at least one copper uranate selected from the group consisting of $CuUO_4$ and $CuU_3O_{10}$ and at least one oxide of copper selected from the group consisting of CuO and $Cu_2O$; and wherein the total weight of uranium present in the partially reduced catalyst composition based on the total weight of said catalyst composition is in the range of over 50 to about 90 weight percent, the weight ratio U/Cu in the catalyst is in the range of about 7-1; and at least 30 to 80 weight percent of the copper in the catalyst is in the metallic state and of the remainder of the copper 85 to 100 percent weight % is in the form of said copper uranate and the balance of the copper if any is present in the form of said copper oxide.

2. The composition of claim 1 wherein said alkali-metal is selected from the group consisting of potassium, sodium, and cesium and is present in said composition as an oxide; and the alkali-metal oxide content of the catalyst is in the range of about 0.01 to 2.0 weight percent based on the total weight of the catalyst.

3. The composition of claim 1 wherein the uranium in said catalyst composition comprises at least 99.7 weight percent $^{238}U$ isotope.

4. The composition of claim 1 wherein said catalyst composition before partial reduction consists of a mixture of the following materials in weight percent: CuO 1.0 to 30, $Cu_2O$ 1.0 to 30, $CuUO_4$ 70 to 98, and $K_2O$ 0.01 to 2.0.

5. The composition of claim 1 wherein said catalyst composition before partial reduction consists of a mixture of the following materials in weight percent: CuO 1.0 to 30, $CuU_3O_{10}$ 70 to 98, and $K_2O$ 0.01 to 2.0.

6. The composition of claim 1 wherein said catalyst composition before partial reduction consists of a mixture of the following materials in weight percent: CuO 1.0 to 30, $CuUO_4$ 30 to 68, $CuU_3O_{10}$ 30 to 68, and $K_2O$ 0.01 to 2.0.

7. A method for preparing an activated catalyst composition consisting essentially of an alkali-metal promoted partially reduced mixture of at least one copper uranate and at least one oxide of copper which comprises:
  (1) heating to molten conditions and mixing together 0.1 to 10 moles of copper nitrate hexahydrate ($Cu(NO_3)_2 \cdot 6H_2O$); 0.00036 to 0.1333 moles of an alkali-metal compound having the formula M-A wherein M is an alkali metal selected from the group consisting of Na, the alkali metal Cs and K and A is a member selected from the group consisting of $CO_3$, $HCO_3$, $NO_3$, OH, oxalate, and acetate; and 0.1 to 10.0 moles of at least one oxide of uranium selected from the group consisting of $U_3O_8$, $UO_3$, and $UO_2$; and stirring said mixture until emission of nitrogen oxides and frothing ceases;
  (2) drying small pieces of the material from (1), heating at a temperature in the range of about 400° to 725° F. until a powder is formed and crushing the powder to a particle size in the range of about 100 to 1000 microns; and
  (3) partially reducing the material produced in (2) in a reactor with pure hydrogen at a temperature in the range of about 850°–900° F. and a pressure in the range of about 200–350 psig for a period of about 16–23 hours to produce said activated catalyst composition; wherein the total weight of uranium present in the activated catalyst composition based on the total weight of said activated catalyst composition is in the range of over 50 to about 90 weight percent, the weight ratio U/Cu in the activated catalyst is in the range of about 7-1; and at least 30 to 80 weight percent of the copper in the activated catalyst is in the metallic state and of the remainder of the copper 85 to 100 weight % is in the form of said copper uranate and the balance of the copper if any is present in the form of said copper oxide.

8. The method of claim 7 provided with the additional steps of mixing the crushed powder from step (2) with a binder, molding the powder into pellets having a diameter in the range of about 1/16" to ¼", heating the pellets under a slow stream of nitrogen to a temperature in the range of about 550°–650° F. for 2-3 hours, and then heating the pellets to a temperature of about 750°–850° F. for an additional 3-4 hours.

* * * * *